United States Patent
Dion et al.

(10) Patent No.: US 6,373,254 B1
(45) Date of Patent: Apr. 16, 2002

(54) METHOD AND APPARATUS FOR CONTROLLING THE EFFECT OF CONTACT IMPEDANCE ON A GALVANIC TOOL IN A LOGGING-WHILE-DRILLING APPLICATION

(75) Inventors: Dominique Dion, Houston; Mark T. Frey, Sugar Land; James Stephen Hall, Houston; Qiming Li, Sugar Land; Richard A. Rosthal; Mark A. Fredette, both of Houston, all of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/320,367

(22) Filed: May 25, 1999

Related U.S. Application Data

(60) Provisional application No. 60/088,238, filed on Jun. 5, 1998.

(51) Int. Cl.$^7$ .................................................. G01V 3/20
(52) U.S. Cl. ........................ 324/369; 324/373; 324/375
(58) Field of Search ................................ 324/366, 367, 324/373, 374, 375, 369

(56) References Cited

U.S. PATENT DOCUMENTS

| | | |
|---|---|---|
| 3,772,589 A | 11/1973 | Scholberg |
| 5,235,285 A | 8/1993 | Clark et al. |
| 5,339,037 A | 8/1994 | Bonner et al. |
| 5,396,175 A * | 3/1995 | Seeman ...................... 324/375 |
| 5,399,971 A | 3/1995 | Seeman et al. |
| 5,463,320 A * | 10/1995 | Bonner et al. ............... 324/366 |

FOREIGN PATENT DOCUMENTS

| WO | WO 88/07212 | 9/1988 |
|---|---|---|

OTHER PUBLICATIONS

Davies, D.H. et al., "Azimuthal Resistivity Imaging: A New Generation Laterolog", SPE Paper 24676 (presented at the 67$^{th}$ Annual Technical Conference and Exhibition of the Society of Petroleum Engineers in Washington, D.C., Oct. 4–7, 1992.

Anderson, B. et al., "Response of 2–MHZ LWD Resistivity and Wireline Induction Tools in Dipping Beds and Laminated Formations", SPWLA 31$^{st}$ Annual Logging Symposium, Jun. 24–27, 1990.

Grupping, Theo I.F. et al., "Recent Performance of the Dual–Resistivity MWD Tool", SPE Formation Evaluation (Jun. 1990), pp. 171–176.

(List continued on next page.)

*Primary Examiner*—Jay Patidar
(74) *Attorney, Agent, or Firm*—Brigitte L. Jeffery; Victor H. Segura

(57) ABSTRACT

The present invention describes a method and apparatus to control the effect of contact impedance on a formation resistivity measurement during a logging-while-drilling operation. The control of contact impedance is accomplished by maintaining a substantially zero difference in potential between two monitor electrodes positioned on the resistivity logging tool near a current electrode. The tool can employ a ring electrode configuration and/or a button electrode, configuration. The ring electrode configuration incorporates two pairs of ring monitor electrodes on each side of a ring current electrode. The button electrode configuration incorporates. a monitor electrode, surrounded by a current electrode, surrounded by a second monitor electrode. Insulation gaps are positioned between each electrode to separate the electrodes. A variable current is supplied to the current electrode in each configuration to maintain the same potential at each monitor electrode. The effect of contact impedance is controlled through maintaining the same potential at each monitor electrode.

22 Claims, 7 Drawing Sheets

OTHER PUBLICATIONS

Allen, D.F. et al., "Integration of Wireline Resistivity Data with Dual Depth of Investigation 2–MHZ MWD Resistivity Data", SPWLA Thirtieth Annual Logging symposium, Jun. 11–14, 1989.

Grupping, T.I.F. et al., "Performance Update of a Dual–Resistivity MWD Tool with Some Promising Results in Oil–Based Mud Applications", SPE Paper 18115 (presented at the 63$^{rd}$ Annual Technical Conference and Exhibition of the Society of Petroleum in Houston, Texas, Oct. 2–5, 1988).

Clark, B. et al., "Electromagnetic Propagation Logging While Drilling: Theory and Experiment", SPE Paper 18117 (presented at the 63$^{rd}$ Annual Technical Conference and Exhibition of the Society of Petroleum in Houston, Texas, Oct. 2–5, 1988).

Chemali, R. et al., "The Effect of Shale Anisotropy on Focused Resistivity Devices", Paper H, SPWLA Twenty–Eighth Annual Logging Symposium, Jun. 29, Jul. 2, 1987.

Gianzero S. et al., "A New Resistivity Tool for Measurement–While–Drilling", Paper A, SPWLA Twenty–Sixth Annual Logging Symposium, Jun. 17–20, 1985.

Smits, J.W. et al., "High Resolution from a New Laterolog with Azimuthal Imaging", SPE Paper 30584 (presented at the 1995 SPE Annual Technical Conference and Exhibition in Dallas, Texas, Oct. 22–25, 1995).

Bonner, S. et al., "A New Generation of Electrode Resistivity Measurements for Formation Evaluation While Drilling", Paper OO, SPWLA 35$^{th}$ Annual Logging Symposium, Jun. 19–22, 1994.

Rosthal, R. et al., "Vertical Deconvolution of 2MHz Propagation Tools", Paper W, SPWLA 34$^{th}$ Annual Logging Symposium, Jun. 13–16, 1993.

* cited by examiner

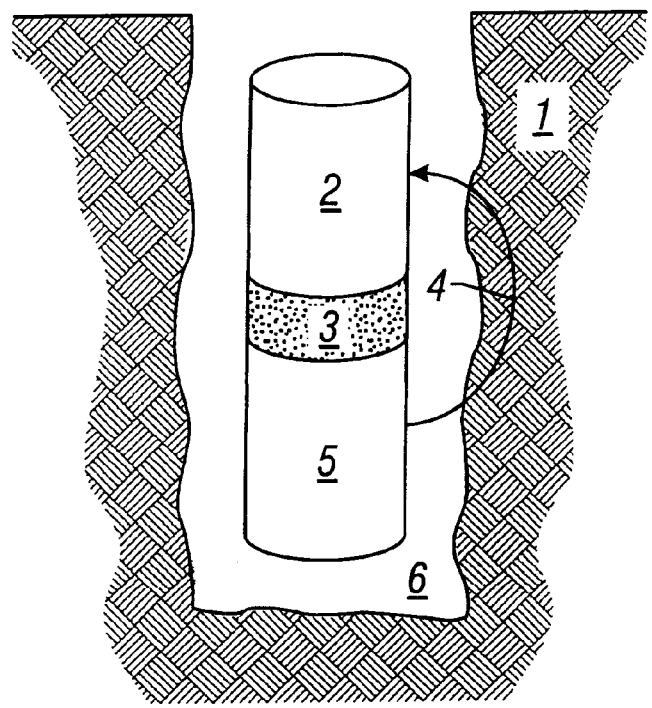
FIG. 1 *(prior art)*
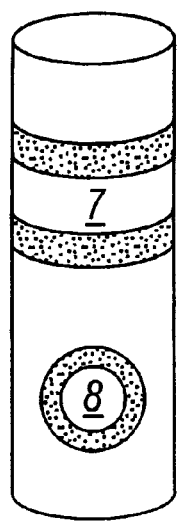
FIG. 2 *(prior art)*

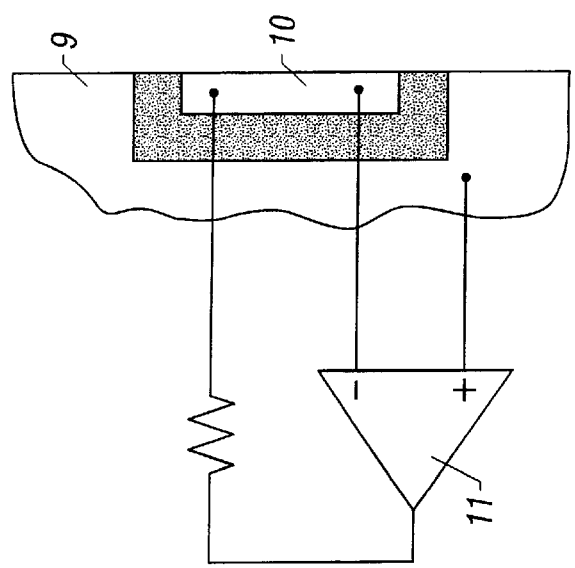
FIG. 5
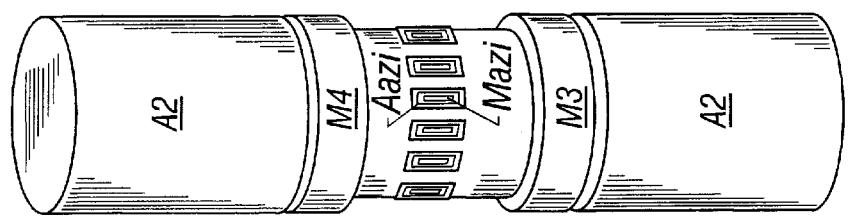
FIG. 4 *(prior art)*
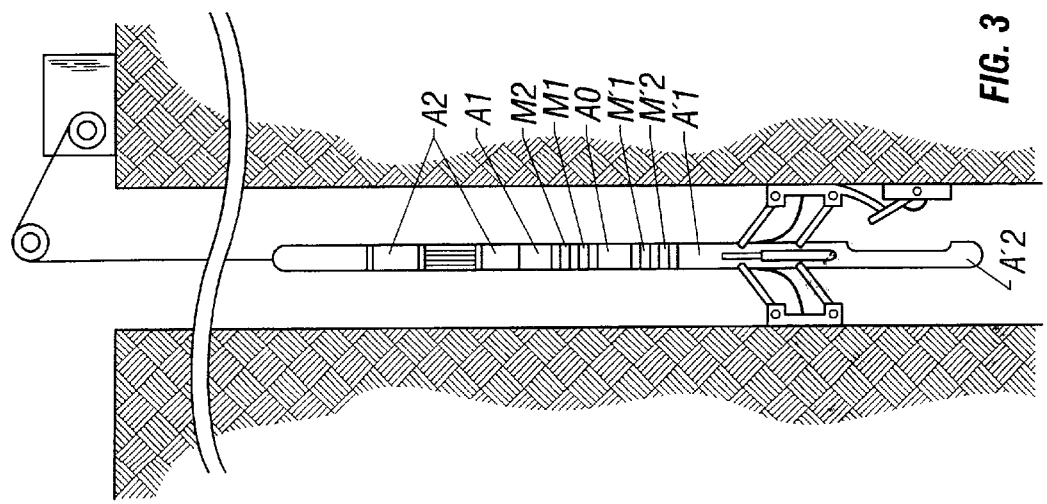
FIG. 3 *(prior art)*

METHOD AND APPARATUS FOR CONTROLLING THE EFFECT OF CONTACT IMPEDANCE ON A GALVANIC TOOL IN A LOGGING-WHILE-DRILLING APPLICATION

CROSS REFERENCE TO RELATED APPLICATION

This application claims priority from Provisional Application No. 60/088,238, filed on Jun. 5, 1998, the contents of which are incorporated by reference.

FIELD OF THE INVENTION

This invention relates to the field of well logging and more particular, it relates to a method and apparatus for controlling the effect of contact impedance on a formation resistivity measurement during a logging while drilling operation.

BACKGROUND OF THE INVENTION

Resistivity logging, which measures the electrical resistivity of earth formations surrounding a borehole, is a commonly used technique for formation evaluation. In general, porous formations having high resistivity are filled with hydrocarbons, while porous formations having low resistivity are water saturated. One technique used to measure formation resistivity is galvanic logging or electrode logging. This resistivity measurement technique uses various arrangements of electrodes on a logging device to generate and measure electrical currents and/or potentials from which one determines formation resistivity.

Various tools and techniques exist that can perform formation evaluations. Some of these tools include logging-while-drilling tools, wireline tools and coiled-tubing tools. As shown by FIG. 1, during formation resistivity measurements, a voltage difference is created between two sections of an electrically conductive tool body, usually a drill collar, separated by an insulating gap 3 (subsequently, insulating gaps will be consistently depicted in gray). By direct conduction, current (shown schematically as 4) flows out of one section of the tool 2, through the borehole 6 and formation 1, and returns to the other section 2. Referring to FIG. 2, radial currents used to compute resistivities are measured directly by ring 7 and button 8 electrodes. The ring electrode comprises a metal band around the tool while the button electrode comprises a metal disc mounted on the collar. the collar. Both ring and button electrodes are electrically isolated from the collar. The collar surrounding an electrode acts as a guard electrode to focus the electrode current into the formation. The surfaces of the electrode and the surrounding collar must be held at the same potential to ensure radially outward current flow. In conventional tool designs, the electronics maintain the potential of the electrode metal at the potential of the collar metal. In the absence of contact impedance effects, this assures that the potentials appearing in the borehole immediately outside the electrodes or the collar are equal. Doing this is necessary to insure that current will flow radially into the formation and not axially along the borehole.

During a resistivity logging operation, an impedance layer can develop at the contact between an electrode and electrolyte (in this case borehole fluid or mud). As a result, impedance layers will appear on the surfaces of the electrode and of the collar. The value of contact impedance depends on a number of factors (electrode material, exposure time, pH, fluid salinity, and frequency) and is highly variable.

The effect of a contact impedance layer is to cause the current to be different from what it would be in a perfect tool without contact impedance. When current flows into an electrode or into the collar through a contact impedance layer, a voltage drop is produced and the potential immediately outside the metal is different from the potential inside the metal. A particularly damaging effect occurs whenever two nearby electrodes (i.e. a button and the collar mass) have different contact impedances. When this situation occurs, the potential immediately outside the button will be different from that immediately outside of the collar mass. This difference causes a current to flow through the shunt resistance supplied by the mud between the electrode and the collar mass. This current is added vectorially to the current passing through the formation. The smaller this shunt resistance, the larger this unwanted current and the more the current differs from what would occur in an ideal tool without contact impedance. Shunt resistance is decreased and the problem of contact impedance increased as gaps between electrodes are reduced and as the mud becomes more conductive.

The demand of mechanical ruggedness in the logging while drilling (LWD) environment limits the size of the gaps. Recent work has shown that differences in contact impedance between the RAB electrodes and collar are often large enough ($5$–$20\Omega$-$cm^2$) that the resulting voltage differences at the tool surface can significantly perturb the current pattern and lead to measurement errors.

In wireline well logging, a logging device suspended from a wireline cable is lowered into the borehole after the drillstring is removed. The logging device makes measurements while the cable is withdrawn. The requirements for mechanical ruggedness are less severe than in the LWD environment and correspondingly, the size and placement of electrodes and insulating gaps are more flexible.

Wireline laterolog tools minimize the effect of contact impedance by employing separate voltage monitoring electrodes to sense the voltage of the mud near the surface of the tool. The monitor electrodes emit essentially no current and so are unaffected by contact impedance. Focusing is achieved by means of a feedback loop that adjusts the bucking or survey current to maintain monitoring electrodes at the same voltage. In theory, this requires infinite amplifier gain but in practice this gain must be limited to guarantee stability. Newer tools used digital measurements together with the principle of superposition to achieve the same ends.

The electrode arrangement of the ALAT wireline tool is described in U.S. Pat. No. 5,396,175 issued to Bronislaw Seeman. Referring to FIGS. 3 and 4, in that device, an array of azimuthal electrodes is incorporated into the conventional Dual Laterolog (DLL) array described in U.S. Pat. No. 3,772,589 issued to Scholberg. As described in the Seeman patent, the intermediate section of the logging device carries a central electrode A0, a first pair of monitor electrodes M1, M'1 connected to each other and disposed on opposite sides of the electrode A0, a second pair of monitor electrodes M2, M'2 disposed on opposite sides of the pair M1, M'1, and a first pair of guard electrodes A1, A'1 that are connected to each other and disposed on opposite sides of the pair M2, M'2. The logging device also includes a second pair of guard electrodes A2, A'2 that are connected to each other. The A2 electrode has a top portion and a bottom portion. Between the two portions of the electrode A2, an isolated central section carries a pair of annular monitor electrodes M3 and M4 that are electrically connected together. Between the two annular electrodes, there is an array of azimuthal current electrodes $Aaz_i$ that are spaced apart circumferentially from one another. Each of the azimuthal current electrodes is insulated from the logging device and surrounds an azimuthal monitor electrode $Maz_i$. Each azimuthal monitor electrode is insulated both relative to the logging device and relative to the surrounding azimuthal current electrode.

Formation evaluation electrode resistivity measurements while drilling may be obtained with the Resistivity-at-the-Bit (RAB) tool described in U. S. Pat. Nos. 5,235,285 and 5,339,037. These current RAB logging tools do not address the problem of contact impedance during resistivity logging. There are currently no LWD tools that use monitor electrodes to focus resistivity measurements.

There still remains a need for an apparatus that can account for the effect of contact impedance on a formation resistivity measurement during a LWD operation. This apparatus should also overcome the mechanical limitations of wireline solutions to contact impedance.

SUMMARY OF THE INVENTION

It is an object of this invention to provide a resistivity logging tool for use in logging-while-drilling applications that controls the effects of contact impedance on the resistivity measurement.

It is another object of this invention to provide ring and button electrode geometries that can be used to control the effects of contact impedance and can withstand the logging-while-drilling environment.

The present invention provides an apparatus and method to control the effect of contact impedance on a resistivity measurement during a logging-while-drilling operation. The control of contact impedance is accomplished by maintaining a substantially zero difference in potential between two monitor electrodes positioned on the resistivity logging tool in the vicinity of each current electrode. Insulation gaps isolate the monitor electrodes from the current electrodes and the collar. In this design, the current flowing through the current electrode is adjusted such that the voltage difference between the monitor electrodes is zero. One embodiment of the present invention employs monitor electrodes in a ring geometry. In this design, pairs of ring-shaped monitor electrodes are mounted in insulating gaps on the collar on opposite sides of a ring current electrode. Another embodiment of the present invention is a button electrode assembly employing one monitor that is embedded in the center of a button and another monitor embedded in the collar mass and surrounding the button current electrode. These electrode geometries are able to maintain mechanical integrity in a logging-while-drilling environment.

BRIEF DESCRIPTION OF THE DRAWINGS

FIG. 1 is a diagram of the voltage difference created between two sections of the RAB tool and the resulting current flow through the borehole and formation.

FIG. 2 is a diagram of the ring and button electrodes on the current RAB resistivity logging-while-drilling tool.

FIG. 3 shows a prior art logging apparatus, the ALAT wireline laterolog tool, suspended in a borehole.

FIG. 4 shows a configuration of azimuthal electrodes used by the FIG. 3 sonde.

FIG. 5 is a schematic of an electrode together with its feedback electronic connections in the current RAB tool.

DETAILED DESCRIPTION OF THE INVENTION

Figure 8:
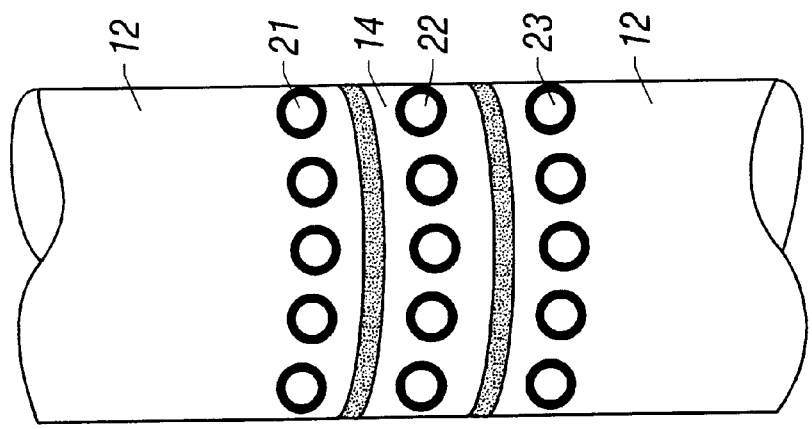
FIG. 8 is a monitor-in-the-electrode ring embodiment employing arrays of "button" monitor electrodes.

In a conventional RAB tool, the ring and button electrodes act as both current measuring electrodes and voltage sense electrodes. FIG. 5 shows a schematic of one of these electrodes 10 inset in the collar 9 together with a feedback circuit 11. This system can produce errors in the measure current in the presence of contact impedance when the tool is run in a borehole filled with very conductive mud. The present invention described herein employs separate monitor electrodes connected to the high-impedance inputs of the feedback circuitry to sense potential differences at two or more points on the surface of the LWD tool near the current electrode. The geometry of an electrode arrangement affects the performance of the resistivity measurement. The mechanical requirements of an electrode in a logging-while-drilling tool require that insulating gaps in the electrode be small compared to the insulation gaps in laterolog tools. As a result, the response of electrodes in LWD applications is correspondingly different from their wireline counterparts.

Based on the results of extensive modeling and experimentation, the electrodes of the present invention were designed according to a variety of criteria. These criteria were:

1) Accuracy: to what extent does the design reduce the errors in the measured current in the presence of contact impedance?
2) Mechanical robustness (Durability): how durable is the design in the LWD environment and how insensitive is the log response to small changes in the dimensions of the electrodes and insulator gaps due to mechanical tolerances or from resulting from abrasion with the formation and cuttings?
3) Electronic response: how well does the design perform with electronic circuitry that has the finite gain and input impedance which can be employed in an LWD tool?
4) Log response: does the design introduce artifacts in the log response of the tool in the presence of bed boundaries or borehole rugosity?
5) Manufacturability: how difficult and expensive is the design to manufacture using known fabrication techniques?

Studies have revealed that different designs have different advantages and disadvantages. Control contact impedance effects is most easily accomplished with a symmetric monitor design in which the voltages on the monitor electrodes (also called monitors) are the same in the absence of contact impedance. For monitors embedded in the current electrodes the monitor and gap widths should be nearly identical. For monitor pairs in insulating gaps, symmetry requires the monitors to be of nearly identical and placed evenly in the gap. It is possible to choose a focused asymmetric monitor electrode arrangement by adjusting the various gap and monitor electrode widths, however, modeling and experiment show that such arrangements are sensitive to small changes in these dimensions, making their use questionable under abrasive LWD conditions. The monitors embedded-in-electrodes designs are more sensitive to potential differences between the surfaces of the current electrode and the collar and thus do not require as high a gain for the feedback electronicsas in the two monitors in a gap design. However, the embedded monitors design can produce log anomalies at boundaries of beds of contrasting resistivity. The resistivity contrast beyond which this occurs depends on the specific electrode and gap dimensions.

Ring Electrode Embodiment

Figure 7:
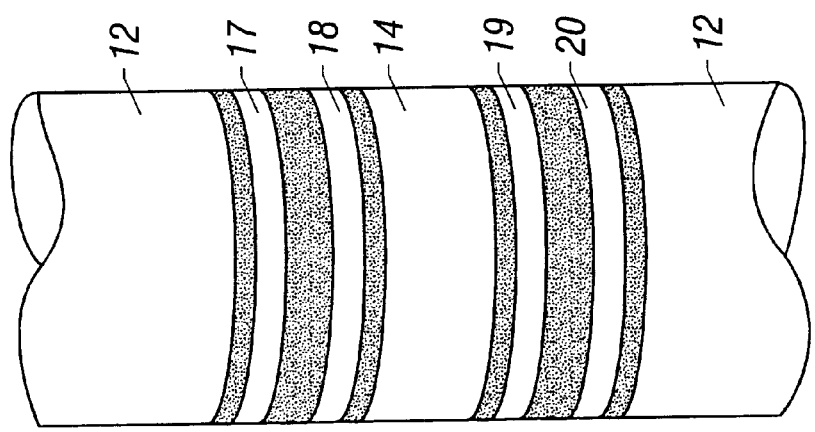
FIG. 7 is a monitor-pair-in-the-gap ring embodiment.
Figure 6:
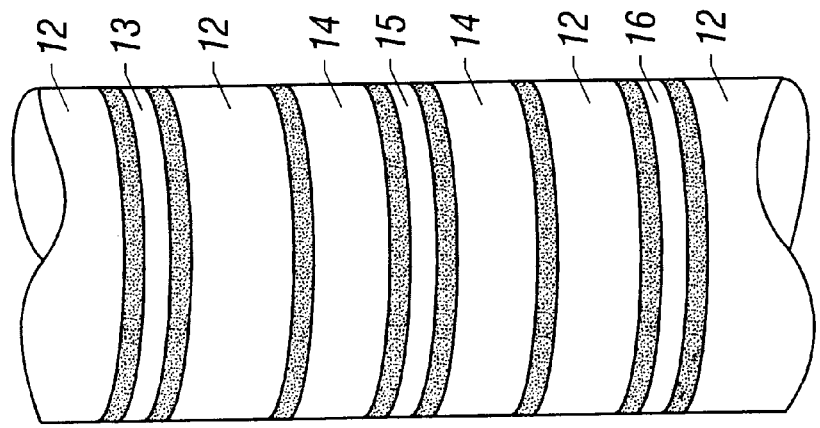
FIG. 6 is a monitor-in-the electrode ring embodiment.

FIGS. 6, 7, and 8 show three basic ring electrode embodiments of the present invention. FIG. 6 has two monitor electrodes 13 and 16 embedded in the collar 12 and a monitor electrode 15 embedded in the ring 14. FIG. 7 has two pairs of monitor electrodes 17, 18 and 19, 20 located in insulating gaps between the ring 14 and collar 12 on both sides of the ring. The embodiment of FIG. 8 is similar to FIG. 6, but instead of monitors being continuous rings the monitors 21, 22 and 23 are a series of "button" monitors. Table 1 summaries the results the evaluation of these electrode arrangements based on the five above-described criteria.

noted that this does not mean that the other designs or combinations thereof are not usable.

Figure 9:
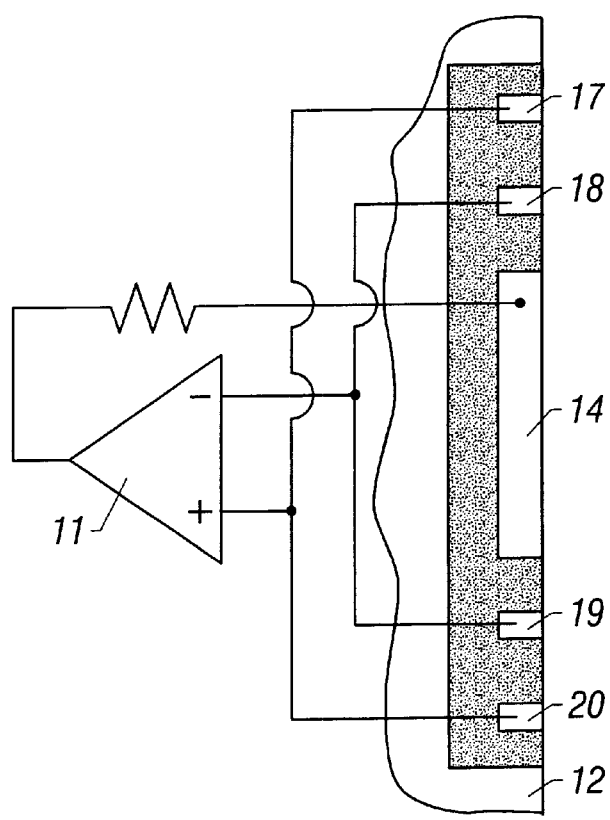
FIG. 9 is a schematic of the ring assembly of FIG. 7 and its associated feedback electronics.

FIG. 9 shows a schematic of the ring monitor assembly FIG. 7. Monitor pairs 17 and 20 are electrically connected together, as are monitors 18 and 19. The net result is that the electric circuitry 11 supplies current to the ring 14 such that $V_{17}+V_{20}=V_{18}+V_{19}$, (where $V_{17}$ is the voltage on electrode 17, $V_{18}$ is the voltage on electrode 18, $V_{19}$ is the voltage on electrode 19 and $V_{20}$ is the voltage on electrode 20). This connection scheme is simple to implement, but the same result can be accomplished with other electrical connections not described herein.

Button Electrode Embodiment

Figure 10:
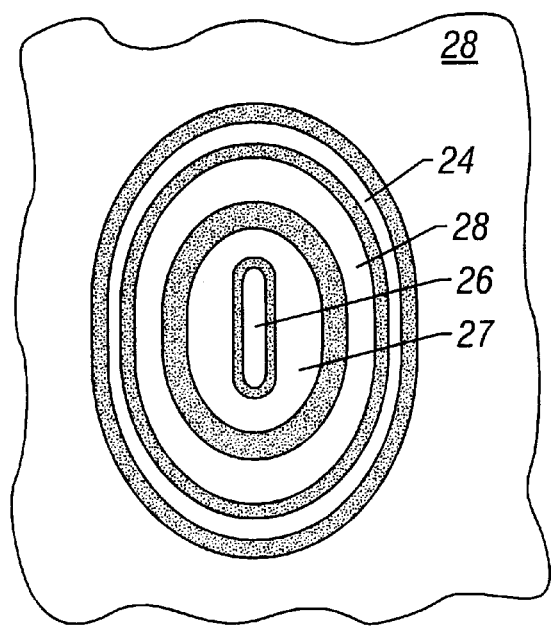
FIG. 10 is a monitor-in-the-electrode button embodiment.
Figure 11:
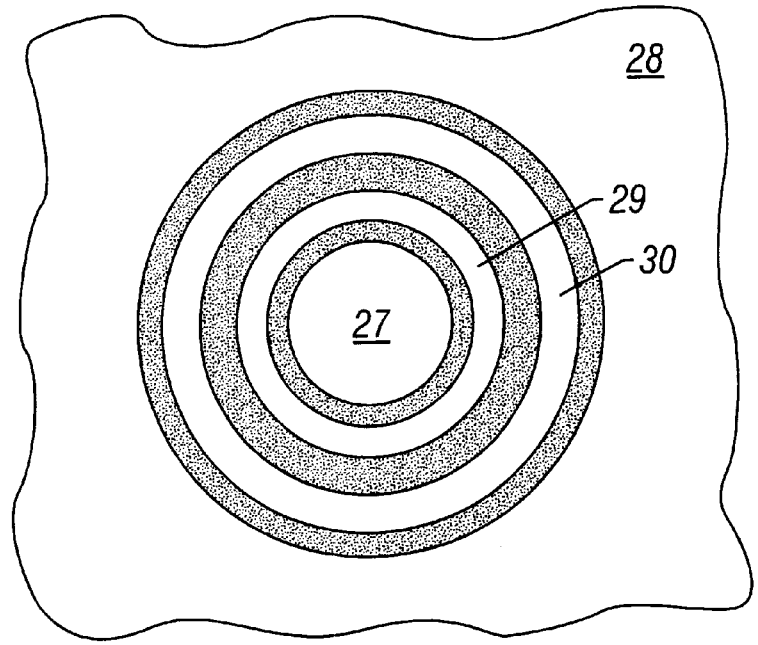
FIG. 11 is a monitor-pair-in-the-gap button embodiment.
Figure 12:
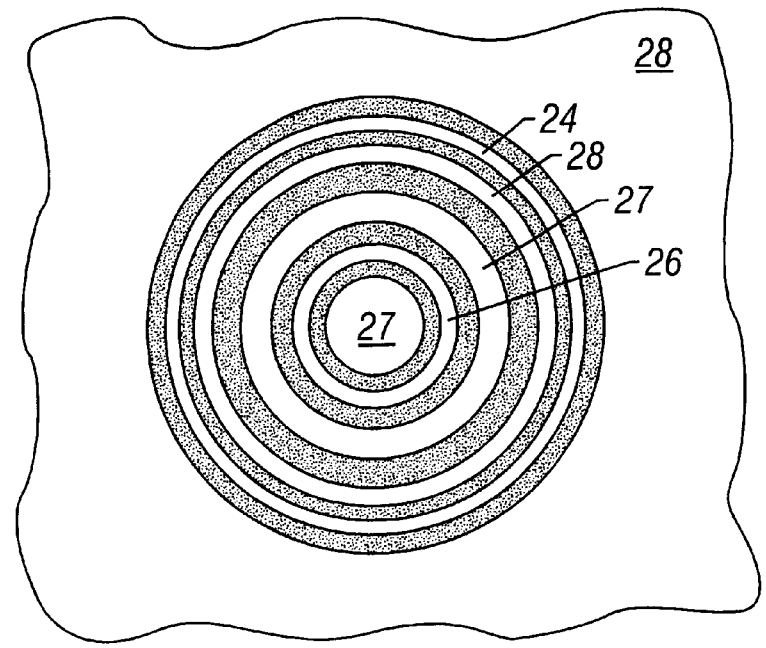
FIG. 12 is an alternate embodiment of a monitor-in-the-electrode button assembly design.
Figure 13:
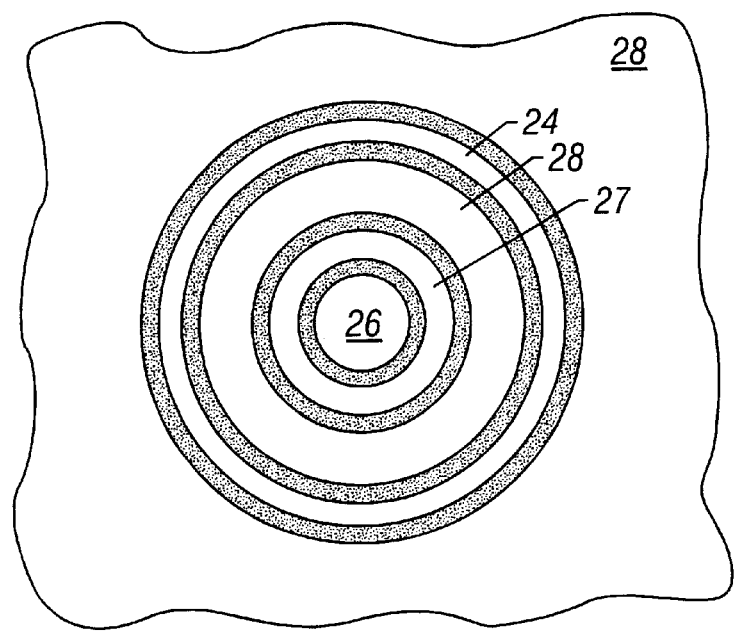
FIG. 13 is an alternate embodiment of a monitor-in-the-electrode button assembly.
Figure 14:
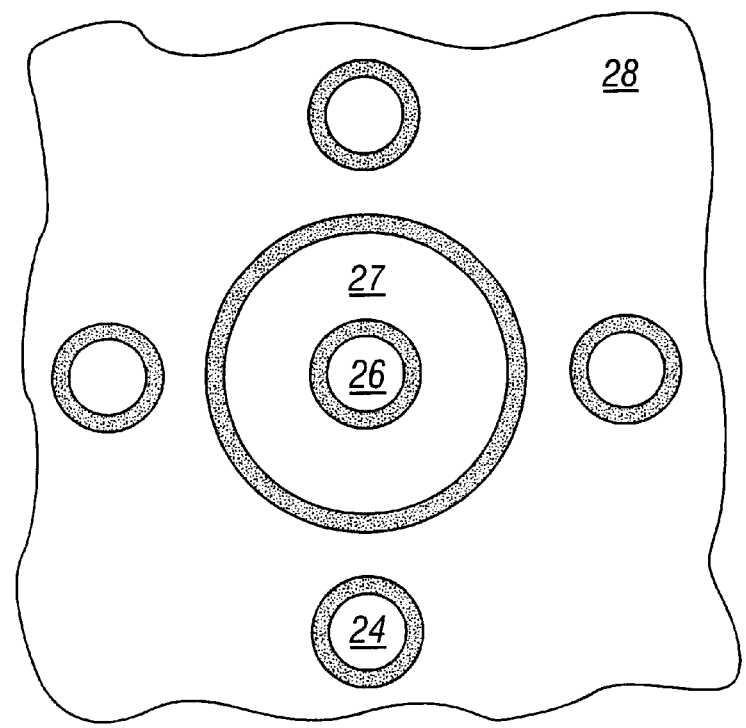
FIG. 14 is an alternate embodiment of a button assembly employing arrays of "button"-shaped monitors.

FIG. 10, 11, 12, 13 and 14 show five button electrode embodiments of the present invention. FIG. 10 has a monitor 24 embedded in the collar 28 and another monitor 26 embedded in the center of the current electrode 27. The width of both monitors and their associated gaps are the same. FIG. 11 has two monitors 29 and 30 positioned in a gap between the current electrode 27 and collar 28. In FIG. 12,the electrode embodiment has a circular design. The current electrode 27 is a circular ring and is in the center of the button. Monitor electrodes 24 and 26 surround the current electrode. The embodiment in FIG. 13 is similar to FIG. 10 except that the monitor 26 is a "button" whose width is different from monitor 24. FIG. 14 consists of arrays of similar "button" shaped monitors. One array 31 is embedded

TABLE I

| Criterion | FIG. 6 | FIG. 7 | FIG. 8 |
|---|---|---|---|
| Accuracy | Good, eliminates error. | Good | Good |
| Durability | Good if gaps are small (~<0.25") | Good, if gaps are small and monitors >⅛" wide | Good if gaps are small |
| Electronic Response | Good | Satisfactory, although relatively more sensitive to the finite gain of the electronics. | Finite input impedance could be a problem for small monitors. |
| Log Response | Artifacts at bed boundaries perpendicular to the tool body | No log artifacts attributable to monitoring | Artifacts at bed boundaries perpendicular to the tool body. |
| Manufacturability | good | good | difficult |

Based on this evaluation, the embodiment of FIG. 7 showed the best results of the three electrode arrangements and may be the best design for the LWD applications. It should be in the collar. Another array 32 is embedded in the current electrode. Table II summaries the results of their evaluation based on the 5 criteria.

TABLE II

| Criterion | FIG. 10 | FIG. 11 | FIG. 12 | FIG. 13 | FIG. 14 |
|---|---|---|---|---|---|
| Accuracy | Good. | Good. | Good. | Poor in practice. | Good. |
| Durability | Good. | Good. | Good. | Good | Good. |
| Electronic Performance | Good. | Poor, sensitive to finite gain of electronics. | Good. | Poor, sensitive to finite input impedance. | Poor, sensitive to finite input impedance. |
| Log Response | Artifacts at bed boundaries with high contrast. | No artifacts. | Artifacts at bed boundaries with high contrast. | Artifacts at bed boundaries. | Artifacts at bed boundaries. |
| Manufacturability | OK. | OK. | OK. | OK. | OK. |

Based on this evaluation, the design in FIG. 10 showed the best results of the various button arrangements. It should be noted that this does not mean that the other designs or combinations thereof are not usable.

Figure 15:
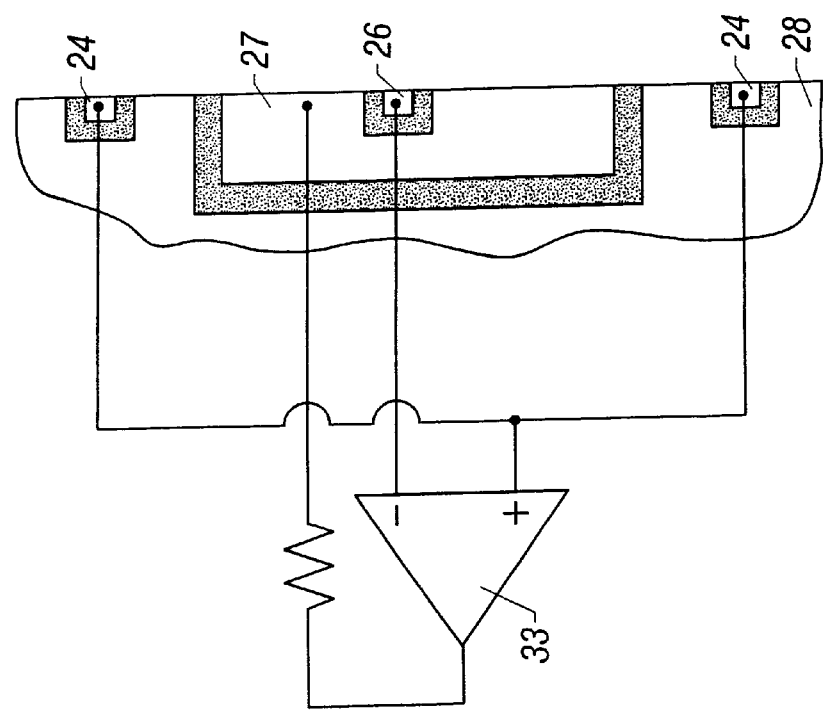
FIG. 15 shows a schematic of the button monitor embodiment of FIG. 10 its associated feedback electronics.

In a further description, FIG. 15 shows a schematic of monitored button embodiment design in FIG. 10. Let $V_{24}$ be the voltage on electrode 24 and $V_{26}$ the voltage on electrode 26. The feedback circuitry 33 supplies the necessary amount of current to the current electrode 27 to force $V_{24}=V_{26}$.

Figure 16:
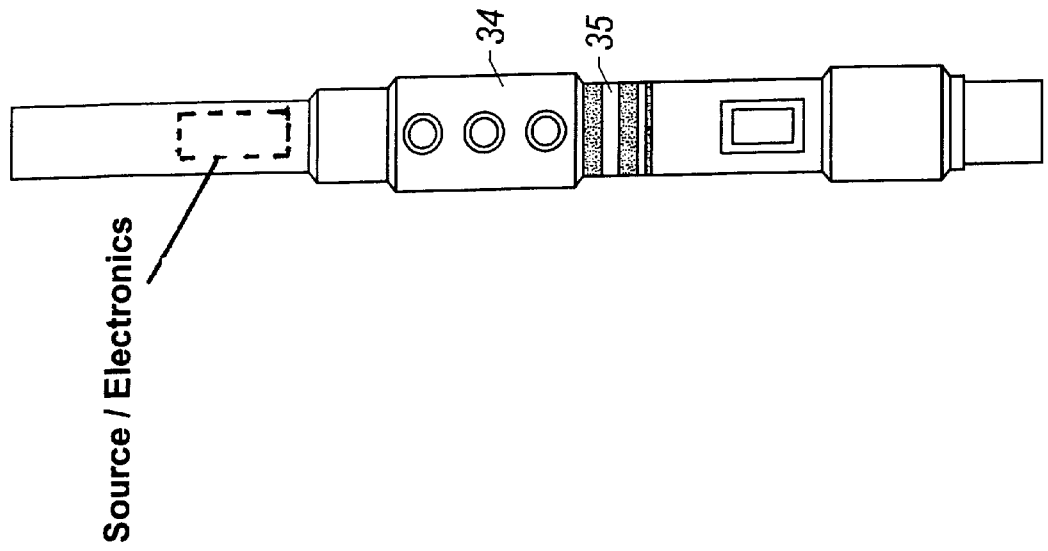
FIG. 16 is an overview design of a RAB tool incorporating the features of the present invention.

FIG. 16 shows the external surface of a resistivity tool incorporating the features of the present invention. Section 34 of the tool shows three button electrode assemblies for measuring azimuthally resolved formation resistivity at various formation depths of investigation. Section 35 is the ring electrode section.

The new ring and button designs can be implemented in the current RAB tool without the need to redesign the remainder of the tool. U.S. Pat. No. 5,339,037 and U.S. Pat. No. 5,463,320 describes a measuring-while drilling apparatus in which the improvement of the present invention can be employed. The main change of the present invention is to the button and ring electrode configurations.

The apparatus and methods of this invention provide significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention, which is limited only by the following claims.

We claim:

1. An apparatus, on a drill string conveyed tool, for determining the resistivity of a formation surrounding a borehole, said apparatus being capable of controlling the effect of contact impedance on the formation resistivity measurement, comprising:
   a) an elongated electrically conductive body that is moveable through the borehole;
   b) a current source;
   c) a ring current electrode positioned on said body and adapted for receiving current from said source;
   d) a plurality of ring monitor electrodes positioned on said body in close proximity to said current electrode;
   e) a guard electrode positioned on said body and adapted to assist in directing current from said formation into said current electrode, wherein at least one ring monitor electrode is embedded in said guard electrode;
   f) a means for controlling detected potentials at at least two monitor electrodes of said plurality of ring monitor electrodes; and
   g) a means for deriving an indication of formation resistivity from said current received at said current electrode.

2. The apparatus of claim 1 wherein said at least two monitor electrodes are symmetrical around said current electrode.

3. The apparatus of claim 1 wherein said at least two monitor electrodes are symmetrical with respect to said current electrode.

4. The apparatus of claim 1 wherein said guard electrode is symmetrical around said current electrode.

5. The apparatus of claim 1 further comprising insulation gaps between said ring monitor electrodes and the surface of said body, said insulation gaps being symmetrical around said current electrode.

6. The apparatus of claim 1 wherein at least 2 monitor electrodes of said plurality of ring monitor electrodes are positioned between the current electrode and said guard electrode.

7. The apparatus of claim 1 wherein at least 1 monitor electrode of said plurality of ring monitor electrodes is embedded in said current electrode.

8. The apparatus of claim 1 wherein said controlling means is an electrical circuit feedback loop adapted to adjust said current received by said ring current electrode.

9. The apparatus of claim 1 wherein said controlling means is a digital circuit adapted to adjust said current received by said ring current electrode.

10. The apparatus of claim 9 wherein said digital circuit is a time or frequency multiplexing circuit.

11. The apparatus of claim 1 wherein said at least two controlled monitor electrodes are electrically coupled.

12. The apparatus of claim 11 wherein said controlling means is a feedback loop circuit connected to said at least two monitor electrodes and to said current electrode and adapted to adjust current emitted by said current electrode to maintain a substantially zero voltage potential difference between said at least two monitor electrodes.

13. A method for controlling the effect of contact impedance on a formation resistivity measurement during a logging operation of a drill string conveyed tool, using an apparatus that has at least one source, a ring current electrode embedded in a guard electrode and a plurality of ring monitor electrodes, said method comprising the steps of:
   a) emitting a current into the formation via the source;
   b) receiving and measuring the current at the current electrode;
   c) simultaneously with step (b) detecting the potentials on a pair of monitor electrodes of said plurality of ring monitor electrodes; and
   d) controlling the effect of contact impedance on the resistivity measurement by maintaining a substantially zero difference between the potentials on the pair of monitor electrodes.

14. The method of claim 13 wherein said potential difference between the monitor electrodes is maintained by supplying current to said current electrode in response to the measured difference between the potentials of the monitor electrodes.

15. The method of claim 14 wherein said current supplied to the current electrode is varied to account for changes in the formation resistivity.

16. An apparatus, on a drill string conveyed tool, for determining the resistivity of a formation surrounding a borehole, said apparatus being capable of controlling the effect of contact impedance on the formation resistivity measurement, comprising:
   a) an elongated electrically conductive body that is moveable through the borehole;
   b) a current source disposed on the body;
   c) a firstcurrent electrode positioned on the body and longitudinally spaced apart from said source for receiving current from said source;
   d) a guard electrode surrounding said first current electrode;
   e) a first button monitor electrode embedded in said first current electrode;
   f) a second current electrode positioned on the body and longitudinally spaced apart from said source for receiving current from said source;

g) a second button monitor electrode positioned on said body in close proximity to said second current electrode;

h) a means for controlling detected potentials at said button monitor electrodes; and i) a means for deriving an indication of formation resistivity from said current received at said first current electrode and said second current electrode.

17. The apparatus of claim 16 wherein said button monitor potential controlling means is an electrical circuit feedback loop.

18. A ring electrode apparatus for measuring a formation parameter during a logging operation, comprising:

a) a first pair of ring monitor electrodes attached to a measuring tool;

b) said first pair of ring monitor electrodes being adapted to sense a potential at the surface of said measuring tool;

c) a ring current electrode attached to the tool and positioned on the tool between said pairs of monitor electrodes;

d) a source disposed in said tool and adapted to provide current to said current electrodes; and e) a monitor electrode embedded in said ring current electrode and adapted to sense a potential at said current electrode.

19. The ring electrode apparatus of claim 18 wherein the first pair of monitor electrodes are shorted together.

20. An apparatus, on a drill string conveyed tool, for determining the resistivity of a formation surrounding a borehole, said apparatus being capable of controlling the effect of contact impedance on the formation resistivity measurement, comprising:

a) an elongated electrically conductive body that is moveable through the borehole;

b) a current source;

c) a current electrode positioned on said body and adapted to receive current from said source;

d) a monitor electrode embedded in said current electrode;

e) a means for controlling detected potentials at said monitor electrode; and f) a means for deriving an indication of formation resistivity from said current received at said current electrode.

21. The apparatus of claim 20, further comprising a second monitor electrode surrounding said current electrode.

22. The apparatus of claim 21, further comprising a guard electrode positioned between said current electrode and said second monitor electrode.

* * * * *